J. M. DAVIE.
ADJUSTABLE REAMER AND BORING TOOL.
APPLICATION FILED JULY 14, 1919.
1,389,492.
Patented Aug. 30, 1921.
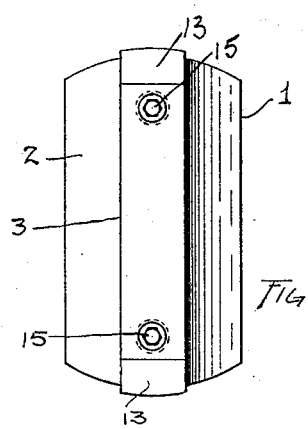
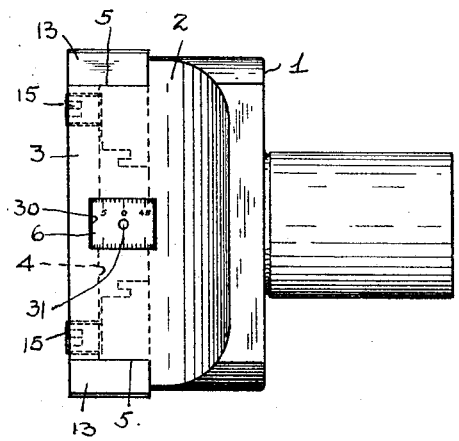
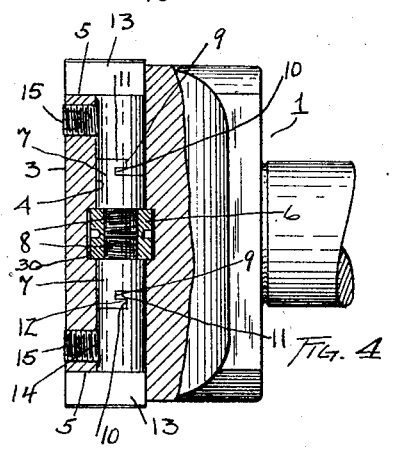
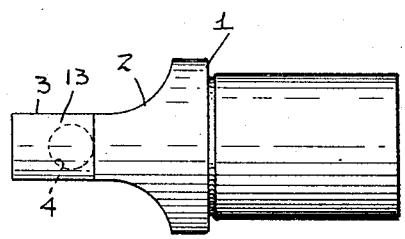
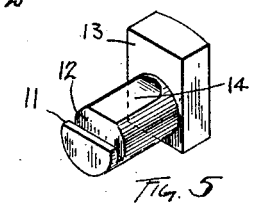
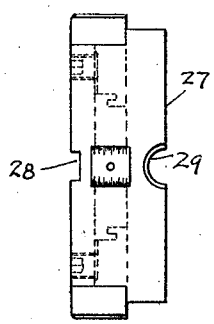
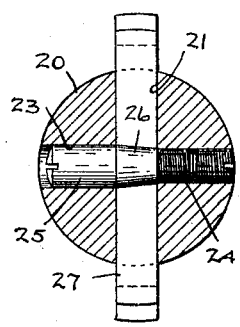
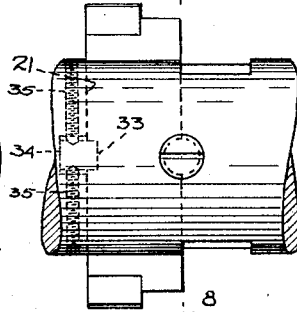
INVENTOR
John M. Davie
By Day, Oberlin & Day
ATTORNEYS.

20# UNITED STATES PATENT OFFICE.

JOHN M. DAVIE, OF CLEVELAND, OHIO.

ADJUSTABLE REAMER AND BORING-TOOL.

1,389,492.  Specification of Letters Patent.  Patented Aug. 30, 1921.

Application filed July 14, 1919. Serial No. 310,654.

*To all whom it may concern:*

Be it known that I, JOHN M. DAVIE, a citizen of the United States, and a resident of Cleveland, county of Cuyahoga, and State of Ohio, have invented a new and useful Improvement in Adjustable Reamers and Boring-Tools, of which the following is a specification, the principle of the invention being herein explained and the best mode in which I have contemplated applying that principle, so as to distinguish it from other inventions.

The present invention relates to reamers or boring tools, in which removable cutting blades are employed. More particularly it relates to means for removably mounting the cutting blades and to other means for adjusting the same when in position in the holder. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a plan view of my improved boring device; Figs. 2 and 3 are a side elevation and an end elevation of the same respectively; Fig. 4 is a plan view partially in section to show the operating mechanism; Fig. 5 is a perspective view of one of the cutting blades; Fig. 6 is a plan view of a modified form of my boring device; Fig. 7 is a plan view showing the device of Fig. 6 mounted in a bar; and Fig. 8 is a section on the line 8—8, Fig. 7.

The present boring device or reamer, as shown in Fig. 1, consists of a suitable holder 1, formed with two sides 2, cut away to leave a flat extending end 3 in which are mounted the cutting blades proper. This end is provided with a transverse aperture 4, the holder being cut off in front of this aperture to form shoulders 5. At the center, there is an opening 30 through the holder to receive a knurled adjusting nut 6 which has a series of tommy-holes 31 to receive a pin in order to turn the nut. Within the aperture 4 are mounted two cutting blades holding members 7 having threaded ends 8 which engage with the interior threads of the adjusting nut 6. These holding members 7 are formed at their outer ends with a tongue 9 and a groove 10 with which engage a complementary tongue 11 and groove 12 formed on the inner ends of the cutting blades 13.

These cutting blades have preferably a cylindrical portion and end in a rectangular cutting portion which fits against the shoulders 5 of the holder. One side of the cylindrical portion is faced off as at 14 and is adapted to be contacted and locked by a set screw 15 mounted in the end of the holder to force the cutting blade tightly against the rear wall of the aperture and against the shoulder 5. The cutting blades and the holding members with the tongue and grooved ends form a unit construction without play.

The inner ends of the holding members have right and left hand threads, respectively, operating in the interior right and left hands threads in the adjusting nut. This nut fits closely within the opening in the holder and is graduated. Preferably fifty graduations are used, as movement of one graduation increases or decreases, the cutting blade diameter 1/1000 of an inch as the screw threads are usually forty to the inch. Other graduations may of course, be employed.

In Figs. 6 and 8 a modified form of device is shown which is intended for use in a bar for boring or reaming. A bar 20 is shown having a slot 21 cut therethrough with a shoulder or key 33 extending from one face. The bar is also provided with two alined apertures 23 and 24, the smaller aperture 24 being threaded to receive one end of a locking screw 25 having a tapered portion 26.

For use in the bar a flat holder 27 is employed having a rectangular notch 28 preferably in the forward face as shown, adapted to engage with the key 33 in the bar. To receive the key 33, the bar is provided with a recess 34 and two adjusting screws 35 which are used to position and lock the key in the bar. The rear face of the holder is formed with a semi-circular notch 29 to receive the tapered portion of the locking screw. Otherwise the holder is similar to the first form with a longitudinal aperture and a vertical opening for the adjusting screw. The cutting blades and the holding members fit within the holder as in the first form described.

In mounting the holder 27 in the bar, the locking screw is removed and the holder inserted with the notch in engagement with the key 33. The locking screw is then inserted and screwed down until the tapered portion has forced the holder tightly and centrally against the forward face of the slot in the bar. To securely lock the holder in place, a set screw is threaded into the aperture 24 until it contacts tightly against the end of the locking screw to hold the locking screw against movement. In the first form the holding members and the cutting blades are engaged and then placed in the holder the set screw 15 being loosened to permit adjustment. When the cutting blades are adjusted, the set screws are forced in to secure the cutting blades in position and the reamer is ready for use.

With my device the holder 27 can also produce a floating movement through the longitudinal aperture in the bar 20, by removing the inserted key 33 in the bar 20, and by a relative position of the tapered screw member to the tapered semi-circular notch 29 in the holder 27. The tapered screw member can be held in any relative position by the binding screw in aperture 24.

The present device is easily assembled and adjusted, the cutting blades alone being made of tool steel while the other parts may be readily and accurately formed out of softer metal which can be accurately worked and which need not be afterward tempered. The cutting blades for the two sides are similar and can be renewed and placed in the holder quickly and easily and then accurately adjusted by means of the adjusting nut. A very convenient and satisfactory reamer and boring tool is thus obtained, all parts fitting easily together and being capable of rapid replacement and accurate adjustment. The cost is reduced as only the cutting blades need to be made of hardened steel and thus no tempering is required and consequent refinishing is eliminated.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of a holder having shoulders at the sides, said holder having a transverse aperture and a vertical opening, an interiorly threaded adjusting nut mounted in such opening in alinement with the aperture, holding members adjustably mounted in such aperture and having threaded ends adapted to engage in said nut, said holding member having tongue and grooved outer ends, cutting blades having enlarged outer ends having tongue and grooved inner ends adapted to engage with said holding members, said cutting blades being mounted in such aperture and extending outwardly of the same in contact with said shoulders on the holder, and means for locking said cutting blades securely against said shoulders in adjusted positions.

2. In a device of the character described, the combination of a holder having shoulders at the sides, said holder having a transverse aperture and a vertical opening, an interiorly threaded adjusting nut mounted in such opening in alinement with the aperture, holding members adjustably mounted in such aperture and having threaded ends adapted to engage in said nut, said holding member having tongue and grooved outer ends, cutting blades having enlarged outer ends having tongue and grooved inner ends adapted to interengage with the tongue and grooved ends of said holding members to form a solid structure, said cutting blades being adjustable in such aperture with said holding members, and means mounted in said holder and adapted to force said cutting blades against said shoulders in their adjusted positions.

3. In a device of the character described, the combination of a holder having shoulders at the sides, said holder having a transverse aperture and a vertical opening, an interiorly threaded adjusting nut mounted in such opening in alinement with the aperture, holding members adjustably mounted in such aperture and having threaded ends adapted to engage in said nut, said holding member having tongue and grooved outer ends, cutting blades having tongue and grooved inner ends adapted to interengage with the tongue and grooved ends of said holding members to form a solid structure, said cutting blades adjustable in such aperture with said holding members, said cutting blades having enlarged rectangular ends adapted to contact with said shoulders on the holder, said cutting blades also having a flat forward face, and means adjustably mounted in said holder and adapted to contact with flat faces to secure said blades against said shoulders.

Signed by me this 11th day of July, 1919.

JOHN M. DAVIE.